(12) United States Patent
Mochizuki

(10) Patent No.: US 6,930,816 B2
(45) Date of Patent: Aug. 16, 2005

(54) SPATIAL LIGHT MODULATOR, SPATIAL LIGHT MODULATOR ARRAY, IMAGE FORMING DEVICE AND FLAT PANEL DISPLAY

(75) Inventor: Fumihiko Mochizuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/758,278

(22) Filed: Jan. 16, 2004

(65) Prior Publication Data

US 2004/0222418 A1 Nov. 11, 2004

(30) Foreign Application Priority Data

Jan. 17, 2003 (JP) .................................... P. 2003-009808

(51) Int. Cl.[7] .......................... G02B 26/00; G02F 1/03; G09G 3/34
(52) U.S. Cl. ...................... 359/291; 359/295; 359/260; 345/84; 345/108
(58) Field of Search ............................. 257/59; 345/84, 345/108; 359/260, 290, 291, 295

(56) References Cited

U.S. PATENT DOCUMENTS 6,195,196 B1 * 2/2001 Kimura et al. .............. 359/295

6,642,913 B1 * 11/2003 Kimura et al. ................ 345/84

FOREIGN PATENT DOCUMENTS

| JP | 11-258558 A | 9/1999 |
|---|---|---|
| JP | 2000-214804 A | 8/2000 |

* cited by examiner

Primary Examiner—David N. Spector
(74) Attorney, Agent, or Firm—Sughrue Mion, PLLC

(57) ABSTRACT

A spatial light modulator has: a support substrate that has an electrode layer; and a movable thin film that has at least an electrode layer, and that is opposingly placed above the support substrate with being separated by a predetermined gap distance in a manner that the movable thin film is flexurally deformable toward the support substrate, and in which a predetermined driving voltage is applied between the electrode layer of the support substrate and the electrode layer of the movable thin film to cause the movable thin film to be deflected toward the support substrate by an electrostatic force acting between the electrode layers. A returning electrode is disposed on an side of the movable thin film opposite to the side which is opposed to the support substrate to apply an electrostatic force of attracting the movable thin film when a driving voltage is applied.

11 Claims, 9 Drawing Sheets

PRIOR ART

SPATIAL LIGHT MODULATOR, SPATIAL LIGHT MODULATOR ARRAY, IMAGE FORMING DEVICE AND FLAT PANEL DISPLAY

BACKGROUND OF THE INVENTION

1. Field of the Invention

The present invention relates to a spatial light modulator, a spatial light modulator array, an image forming device and a flat panel display which perform light modulation by applying a predetermined voltage between an electrode layer of a support substrate and that of a movable thin film opposed to the support substrate to flexurally displace the movable thin film.

2. Description of the Related Art

FIGS. 15 and 16 show an example of a spatial light modulator in the related art which is produced by a micromachining process including steps of film growth, photolithography, and etching of a sacrifice layer (a later which is to be removed away later in order to form a gap), and in which the light transmittance is changed by an electromechanical operation.

In the spatial light modulator 1, a transparent electrode layer 4 is stacked on an optical waveguide 3 to form a support substrate 6, and a movable thin film 9 which is produced by the micromachining process is opposingly placed above the support substrate with being separated therefrom by a predetermined gap distance. The movable thin film 9 is flexurally displaced by an electrostatic force acting between the support substrate 6 and the movable thin film 9, thereby performing light modulation.

Specifically, the movable thin film 9 has a stacked structure of an electrode layer 11 and an elastic layer 12, and has given transparency. The gap distance between the movable thin film 9 and the support substrate 6 is set by a support 14 which is interposed between the thin film 9 and the support substrate 6.

The movable thin film 9 is enabled to be flexurally deformed toward the support substrate 6 by a gap 16 which is ensured between the thin film and the support substrate 6 by the support 14. As shown in FIG. 15, in a state where a non-driving voltage is applied between the electrode layer 4 on the support substrate 6 and the electrode layer 11 on the movable thin film 9 (for example, the non-application voltage V=0), an attractive force due to an electrostatic force does not act between the electrode layers 4 and 11, and the movable thin film 9 maintains its initial flat state.

In this state where the predetermined gap 16 is held between the movable thin film 9 and the support substrate 6, the device shows optical characteristics in which incident light 18 on the optical waveguide 3 is totally reflected at the surface of the electrode layer 4 and is not emitted toward the movable thin film 9.

As shown in FIG. 16, when a predetermined driving voltage Va is applied between the electrode layers 4 and 11, an attractive force due to an electrostatic force acts between the electrode layers 4 and 11, and the movable thin film 9 is deflected at a predetermined degree toward the support substrate 6 by the electrostatic force, thereby producing a state where the elastic layer 12 is in contact with the electrode layer 4. When this state is caused, the contact interface of the movable thin film 9 does not satisfy the conditions for total reflection of the incident light 18, so that the device shows optical characteristics in which the incident light 18 on the optical waveguide 3 is transmitted through the electrode layer 11 and the elastic layer 12 to be emitted toward the front side of the optical path of the movable thin film 9.

In a spatial light modulator of this kind in the related art, when the driving voltage applied between the electrode layers 4 and 11 in the state of FIG. 16 is canceled, the flexural displacement of the movable thin film 9 is caused to return to the initial state of FIG. 15 by the elastic restoring force of the elastic layer 12, and the incident light 18 cannot be transmitted through the movable thin film 9 (for example, see JP-A-11-258558 and JP-A-2000-214804)

Such a spatial light modulator can be used for a wide variety of applications. Requests for reducing the operating voltage, and increasing the ON/OFF switching speed of a spatial light modulator are growing year by year.

However, a spatial light modulator in the related art in which the returning of the movable thin film 9 to the initial state depends on the elastic restoring force of the elastic layer 12 constituting the movable thin film 9 as described above has a problem in that it is impossible to simultaneously realize the reduction in the operating voltage, and the increase of the ON/OFF switching speed of the spatial light modulator.

When the elastic layer 12 is set to have a weak elastic restoring force, for example, the elastic layer 12 is easily flexurally deformed by a small electrostatic force, so that, even in the case where a low voltage is applied between the electrode layers 4 and 11, the spatial light modulator can operates at a high speed. By contrast, in the case where the elastic restoring force is weak, when the applied voltage is canceled, the returning operation is slow, thereby causing a problem in that high-speed returning cannot be performed.

In order to realize only high-speed returning, it is requested to set the elastic restoring force of the elastic layer 12 to a higher level. When the elastic layer 12 is set to have a strong elastic restoring force, however, a large electrostatic force is required for flexurally deforming the elastic layer 12 toward the support substrate 6. Eventually, high-speed returning must be performed at the sacrifice of the reduction in the driving voltage.

SUMMARY OF THE INVENTION

It is an object of the invention to provide a spatial light modulator, a spatial light modulator array, an image forming device and a flat panel display which can solve the problem discussed above, and in which both the reduction in the operating voltage, and the increase of the ON/OFF switching speed of the spatial light modulator can be simultaneously realized.

In order to attain the object, according to a first aspect of the invention, there is provided a spatial light modulator which comprises: a support substrate that has an electrode layer; and a movable thin film that has at least an electrode layer, and that is opposingly placed above the support substrate with being separated by a predetermined gap distance in a manner that the movable thin film is flexurally deformable toward the support substrate, and in which a predetermined driving voltage is applied between the electrode layer of the support substrate and the electrode layer of the movable thin film to cause the movable thin film to be deflected toward the support substrate by an electrostatic force acting between the electrode layers, whereby optical characteristics of the device with respect to incident light are changed to perform light modulation on the incident light, wherein a returning electrode is disposed on a side of the movable thin film, the side being opposite to the support substrate, the returning electrode applying an electrostatic force of attracting the movable thin film when a driving voltage is applied.

In the thus configured spatial light modulator, when the spatial light modulator is set to the ON state by applying a voltage between the electrode layers of the support substrate and the movable thin film and the voltage application is then canceled to turn OFF the spatial light modulator, the movable thin film which is deflected toward the support substrate is compulsively returned by the elastic restoring force, and also by an electrostatic attractive force which is caused to act in the direction opposite to the side of the support substrate by applying a driving voltage between the movable thin film and the returning electrode. In the case where the elastic restoring force of the movable thin film is previously set to a weak level in order to realize a low-voltage driving, therefore, the return speed of the movable thin film in the state change of the spatial light modulator from the ON state to the OFF state can be increased even when the elastic restoring force is weak. Consequently, both the reduction in the driving voltage, and the increase of the ON/OFF switching speed of the spatial light modulator can be simultaneously realized.

According to a second aspect of the invention, there is provided a spatial light modulator as set forth in the first aspect of the invention, wherein a spacer which prevents the movable thin film from being flexurally deformed toward the returning electrode is disposed between the movable thin film and the returning electrode.

In the spatial light modulator, when the spatial light modulator is changed from the ON state to the OFF state, the spacer can prevent the movable thin film from being excessively flexurally deformed toward the returning electrode by the electrostatic force applied by the returning electrode.

According to a third aspect of the invention, there is provided a spatial light modulator as set forth in the first or second aspect of the invention, wherein a change of the optical characteristics is a change of total reflection conditions due to a change of a refractive index of an interface between the movable thin film and the support substrate, the refractive index change being caused by making the movable thin film contact with the support substrate.

In the thus configured spatial light modulator, when the support substrate and the movable thin film make contact with each other, the interface between the support substrate and the movable thin film is set to a light transmitting state, and, when the support substrate and the movable thin film are separated from each other, the gap between them is set to a light blocking state, thereby performing light modulation.

According to a fourth aspect of the invention, there is provided a spatial light modulator as set forth in the third aspect of the invention, wherein the electrode layer of the support substrate, the electrode layer of the movable thin film, and the returning electrode are optically transparent.

In the thus configured spatial light modulator, since all of the electrode layer of the support substrate, that of the movable thin film, and the returning electrode are optically transparent, the reduction in the light intensity which is caused when the incident light passes through the device is suppressed so that the intensity of the emission light can be enhanced.

According to a fifth aspect of the invention, there is provided a spatial light modulator as set forth in the first or second aspect of the invention, wherein a multilayer reflective film is disposed on each of opposed sides of the movable thin film and the support substrate, and the optical characteristics are optical interference characteristics according to the gap distance between the movable thin film and the support substrate, and a wavelength of the incident light.

In the thus configured spatial light modulator, the multilayer reflective films are opposingly placed on the support substrate and the movable thin film, respectively, and the gap distance between the multilayer reflective films is changed, thereby enabling optical interference to be caused by the Fabry-Perot interference effect or the like in accordance with the wavelength of the incident light.

According to a sixth aspect of the invention, there is provided a spatial light modulator array wherein plural spatial light modulator s as set forth in any of the first to fifth aspects of the invention are arranged one- or two-dimensionally.

In the thus configured spatial light modulator array, since the plural spatial light modulators are arranged one- or two-dimensionally, one- or two-dimensional light modulation can be performed.

According to a seventh aspect of the invention, there is provided an image forming device comprising: a light source; a spatial light modulator array as set forth in the sixth aspect of the invention; an illumination optical system which illuminates the spatial light modulator array with light from the light source; and a projection optical system which projects light emitted from the spatial light modulator array onto an image forming face.

In the thus configured image forming device, the spatial light modulator is illuminated with the light from the light source, and light which is modulated by the spatial light modulator array is projected by the projection optical system onto the image forming face.

According to an eight aspect of the invention, there is provided a flat panel display comprising: a light source which emits ultraviolet rays; a spatial light modulator array as set forth in the sixth aspect of the invention; an illumination optical system which illuminates the spatial light modulator array with light from the light source; and a fluorescent member which is excited by light emitted from the spatial light modulator array to emit light.

In the thus configured flat panel display, the spatial light modulator array is illuminated with the ultraviolet rays from the light source, the fluorescent member is illuminated with ultraviolet rays which are emitted by a modulating operation from the spatial light modulator array, and the fluorescent member is excited to emit display light.

DETAILED DESCRIPTION OF THE INVENTION

Hereinafter, preferred embodiments of the spatial light modulator, the spatial light modulator array, an image forming device and a flat panel display of the invention will be described with reference to the accompanying drawings.

Figure 1:
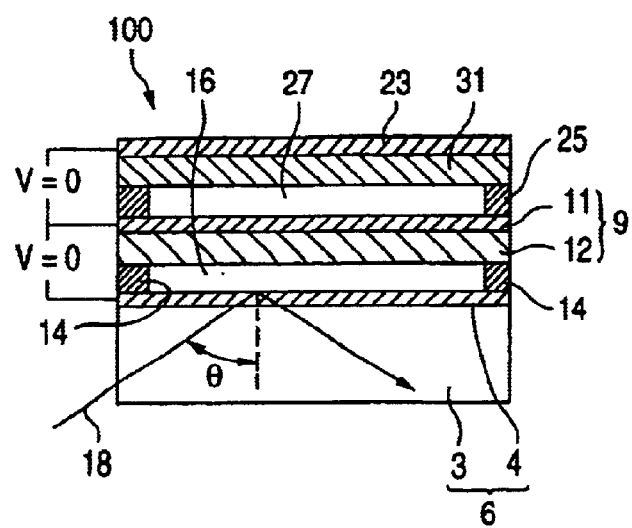
FIG. 1 is a section view showing an OFF state of a spatial light modulator of a first embodiment of the invention.
Figure 2:
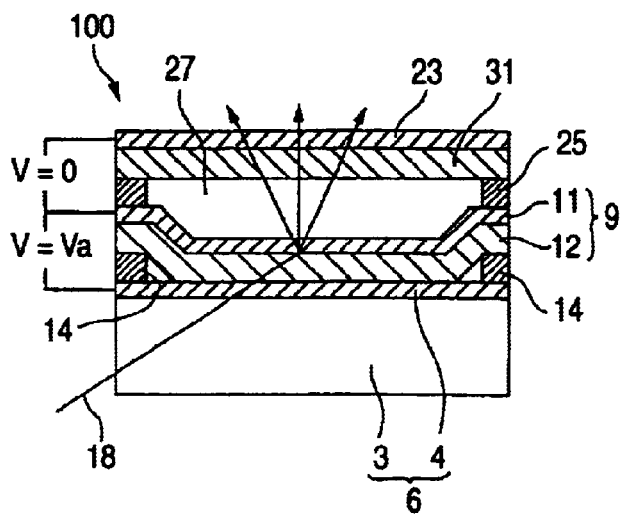
FIG. 2 is a section view showing an ON state of the spatial light modulator of the first embodiment of the invention.
Figure 3:
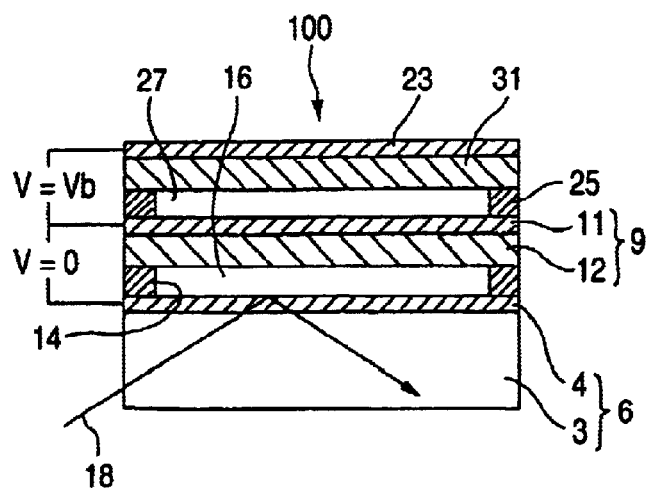
FIG. 3 is a section view showing a state change of the spatial light modulator of FIG. 2 from the ON state to the OFF state.

FIGS. 1 to 3 show the configuration of the spatial light modulator of the invention. FIG. 1 is a section view showing the OFF state of the spatial light modulator, FIG. 2 is a section view showing the ON state of the spatial light modulator, and FIG. 3 is a section view showing a state change of the spatial light modulator from the ON state to the OFF state.

As shown in FIG. 1, the spatial light modulator 100 of the embodiment comprises: a support substrate 6 in which a transparent electrode layer 4 is stacked on an optical waveguide 3; a movable thin film 9 which has a tacked structure of an electrode layer 11 and an elastic layer 12, which is transparent, and which is placed above the support substrate 6 via a support 14 to be opposed to the support substrate with being separated by a predetermined gap distance in a manner that the film is flexurally deformable toward the support substrate 6; a transparent returning electrode 23 which is opposingly placed above the movable thin film 9 with being separated by a predetermined gap distance, and which causes the movable thin film 9 that is flexurally deformed toward the support substrate 6, to be returned by an electrostatic force that is generated by an application of a voltage; and a support 25 which fixedly supports the returning electrode 23 above the movable thin film 9. In the specification, the term of transparent means transparency with respect to at least light which is to be modulated.

Figure 15:
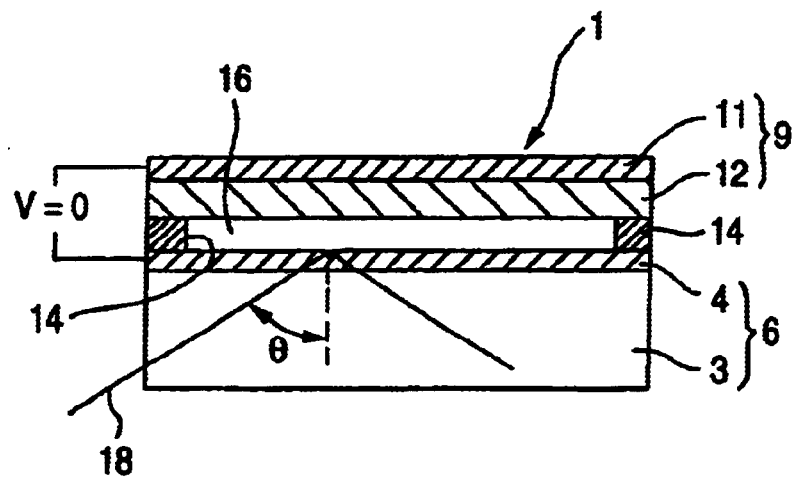
FIG. 15 is a diagram schematically showing the configuration of a spatial light modulator in the related art.
Figure 16:
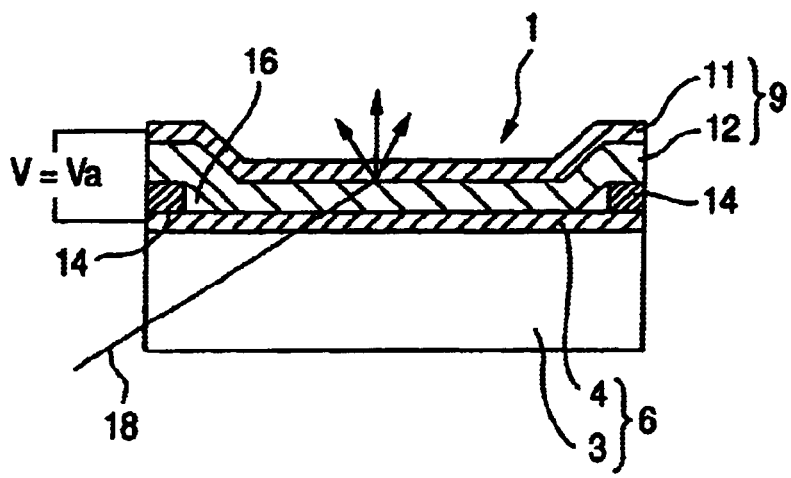
FIG. 16 is a diagram illustrating the operation of the spatial light modulator in the related art.

In the spatial light modulator 100 of the embodiment, the support substrate 6, the support 14, and the movable thin film 9 are identical in configuration with those of the device in the related art shown in FIG. 15. When a predetermined driving voltage Va is applied between the electrode layer 4 on the support substrate 6 and the electrode layer 11 on the movable thin film 9, therefore, the movable thin film 9 is deflected at a predetermined degree toward the support substrate 6 by the electrostatic force acting between the electrode layers as shown in FIG. 2. The change of the optical characteristics due to the deflection enables the incident light on the optical waveguide 3 to be transmitted through the movable thin film 9.

The spatial light modulator 100 of the embodiment is different from the spatial light modulator 1 in the related art in that the returning electrode 23 is disposed. Hereinafter, the returning electrode 23 will be described in detail.

The returning electrode 23 is stackingly placed on a transparent support plate 31 so as to have transparency. When a predetermined driving voltage Vb is applied between the returning electrode 23 and the electrode layer 11 on the movable thin film 9 as shown in FIG. 3, the returning electrode applies an electrostatic force which compulsively returns the movable thin film 9 that is flexurally displaced toward the support substrate 6.

As shown in FIG. 2, when the predetermined driving voltage Va is applied between the electrode layers 4 and 11 of the support substrate 6 and the movable thin film 9 to set the spatial light modulator to the ON state, the returning electrode 23 allows light which has been transmitted from the support substrate 6 through the movable thin film 9, to be transmitted therethrough to the outside.

As the electrodes layers 4 and 11 and the returning electrode 23, a metal oxide of a high electron density such as ITO, a very thin metal film (such as aluminum), a thin film in which metal fine particles are dispersed in a transparent insulator, or a highly-doped wide bandgap semiconductor can be preferably used.

In the spatial light modulator 100 of the embodiment which has been described above, the returning operation of the movable thin film 9 exerted when the state of the spatial light modulator is changed from the ON state caused by applying the voltage Va between the electrode layers 4 and 11 of the support substrate 6 and the movable thin film 9 to the OFF state caused by canceling the voltage application is accelerated by the electrostatic force which is exerted by the returning electrode 23 on the movable thin film 9, in addition to the elastic restoring force of the movable thin film 9.

Even in the case where the elastic restoring force of the elastic layer 12 is previously set to a weak level in order to realize a low-voltage driving, therefore, the return speed of the movable thin film 9 in the state change to the OFF state of the spatial light modulator can be increased by the returning electrode 23. As a result, both the reduction in the driving voltage, and the increase of the ON/OFF switching speed of the spatial light modulator can be simultaneously realized.

In the electrode layer 11 and the elastic layer 12 of the movable thin film 9, preferably, the internal stress in the non-driven state in which the device is in the OFF state is set as low as possible (for example, 20 MPa or lower), and the tensile stress state is more preferable than the compression stress state. In the compression stress state, the movable thin film 9 is arcuately deflected, and the force of driving the device is increased. Therefore, the energy is largely lost, and the speed of the light modulation driving is lowered. When the stress value is a large amount, the movable thin film 9 is deflected not only toward the support substrate 6, but also in a direction perpendicular to the deflection direction, and therefore the device is largely deformed, so that the low-voltage driving and the high-speed driving are made further difficult to perform. When a tensile stress of the movable thin film 9 is set to a small amount or lower or to a no-stress state, therefore, it is possible to form a configuration which is advantageous to the low-voltage driving and the high-speed driving.

Next, a second embodiment of the spatial light modulator of the invention will be described.

Figure 4A:
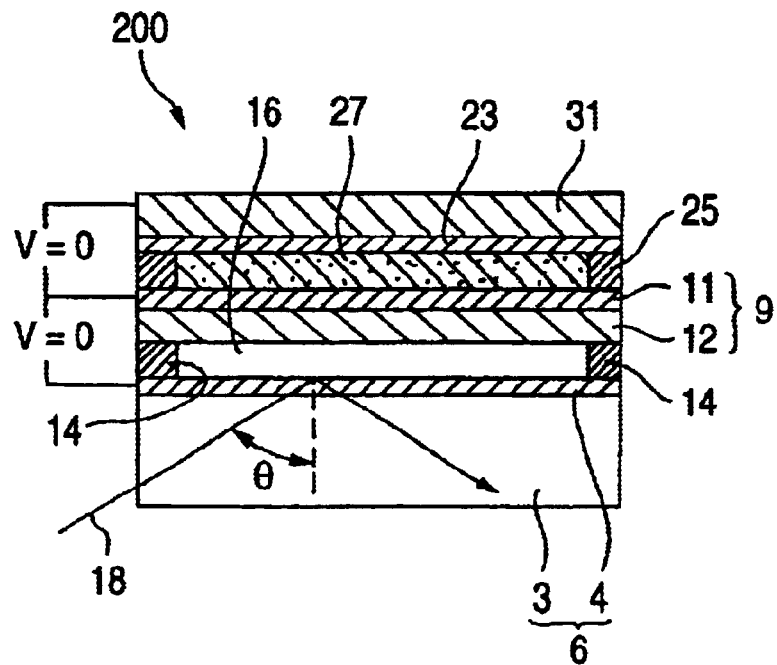
FIGS. 4A and 4B are section views showing the configuration of a spatial light modulator of a second embodiment having a spacer.
Figure 4B:
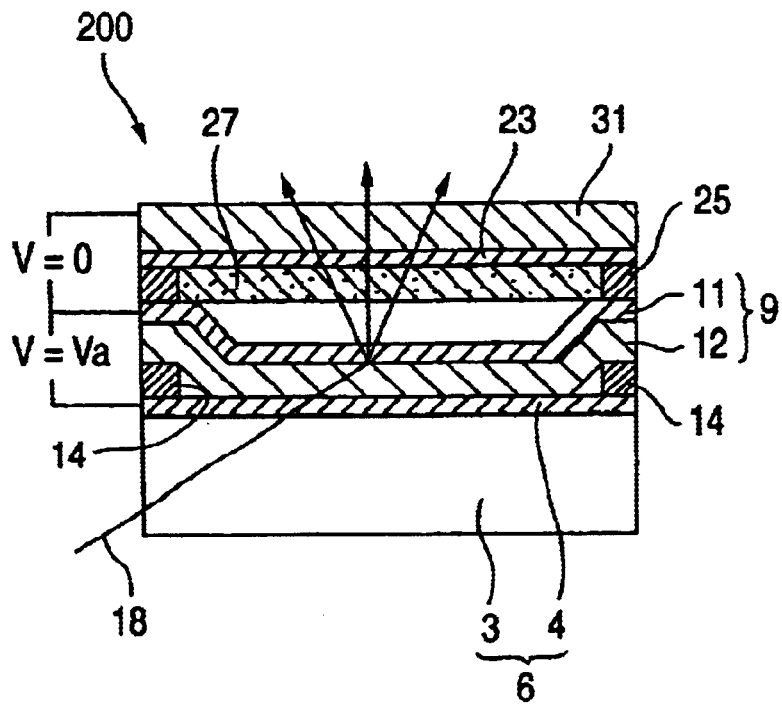

FIGS. 4A and 4B are section views showing the configuration of the spatial light modulator of the embodiment.

In the spatial light modulator 200 of the embodiment, the gap between the movable thin film 9 and the returning electrode 23 is filled with a transparent spacer 27.

The transparent spacer 27 is disposed so as to fill the gap which is formed between the movable thin film 9 and the restoring electrode 23 by the support 25 in the non-driven state of the spatial light modulator 200. When the movable thin film 9 is returned toward the returning electrode 23 in the OFF state of the spatial light modulator, the spacer prevents the movable thin film from being excessively flexurally deformed toward the returning electrode 23.

As the spacer 27, useful is a material which has a predetermined insulating performance, such as silicon oxide, silicon nitride, ceramics, or a resin.

In the thus configured spatial light modulator 200 of the embodiment, in the case where, when the spatial light modulator is changed from the ON state to the OFF state, the returning operation of the movable thin film 9 is accelerated by the electrostatic force applied by the returning electrode 23, the spacer 27 can prevent the movable thin film 9 from being excessively flexurally displaced toward the returning electrode 23. The placement position of the spacer 27 is set so that, when the movable thin film 9 is in the initial position in the returning operation of the movable thin film 9, the surface of the spacer 27 is in contact with that of the movable thin film 9, and the spacer 27 is provided with an adequate buffering performance, whereby the movable thin film 9 after returning is prevented from remaining to oscillate, so that the movable thin film 9 can be rapidly stopped. As a result, the behavior of the movable thin film 9 in a high-speed operation can be stabilized.

Next, a third embodiment of the spatial light modulator of the invention will be described.

Figure 5:
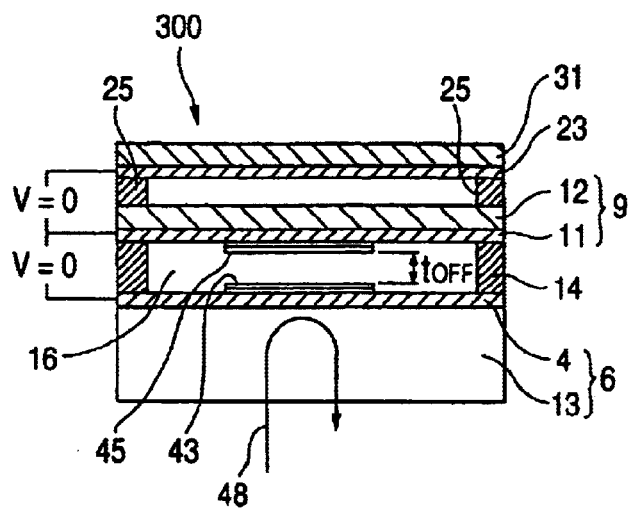
FIG. 5 is a section view showing an OFF state of a spatial light modulator of a third embodiment of the invention.
Figure 6:
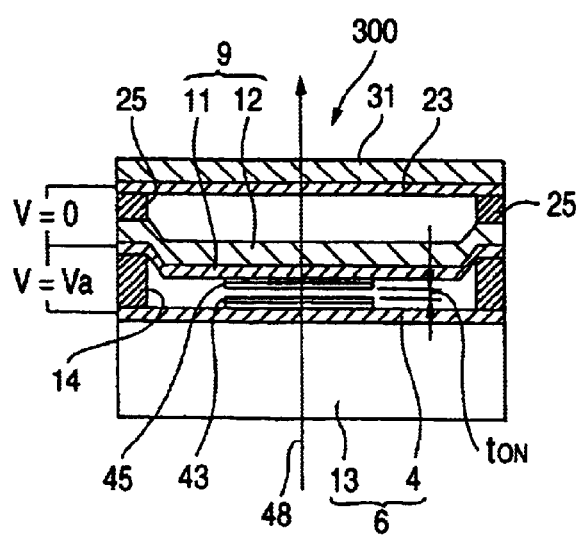
FIG. 6 is a section view showing an ON state of the spatial light modulator of the third embodiment of the invention.
Figure 7:
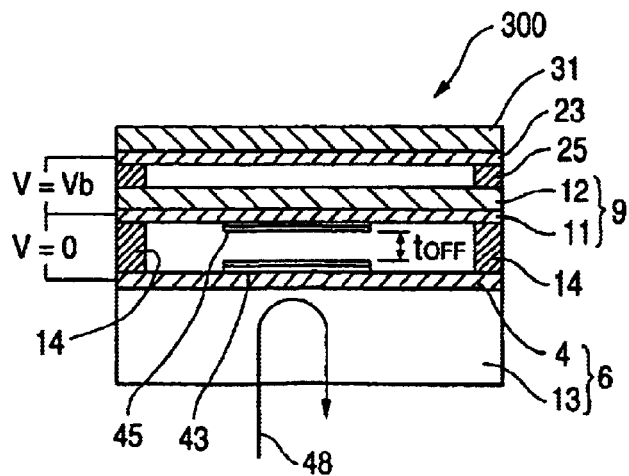
FIG. 7 is a section view showing a state change of the spatial light modulator of FIG. 5 from the ON state to the OFF state.

FIGS. 5 to 7 show the configuration of the spatial light modulator of the embodiment. FIG. 5 is a view showing the OFF state of the spatial light modulator, FIG. 6 is a view showing the ON state of the spatial light modulator, and FIG. 7 is a view showing a state change of the spatial light modulator from the ON state to the OFF state.

As shown in FIGS. 5 to 7, the spatial light modulator 300 of the embodiment comprises: a support substrate 6 in which a transparent electrode layer 4 is stacked on a transparent substrate 13; a movable thin film 9 which has a stacked structure of an electrode layer 11 and an elastic layer 12, which is transparent, and which is placed above the support substrate 6 via a support 14 to be opposed to the support substrate with being separated by a predetermined gap distance in a manner that the film is flexurally deformable toward the support substrate 6; a transparent returning electrode 23 which is opposingly placed above the side of the movable thin film 9 opposite to the side of the support substrate 6, with being separated by a predetermined gap distance, and which causes the movable thin film 9 that is flexurally disposed toward the support substrate 6, to be returned by an electrostatic force that is generated by an application of a driving voltage Vb; and a support 25 which fixedly supports the returning electrode 23 above the movable thin film 9. The embodiment is identical in basic configuration with the first and second embodiments which have been described above. The embodiment may have a configuration in which the gap between the movable thin film 9 and the returning electrode 23 is filled with a transparent spacer 27.

Dielectric multilayer film mirrors 43 and 45 which are multilayer reflective films are disposed on the opposed surfaces of the opposed electrode layers 4 and 11, respectively, to perform light modulation on the incident light on the principle of the Fabry-Perot modulation. Examples of a multilayer reflective film which performs such light modulation are a dielectric multilayer reflective film mirror, and a combination of a dielectric multilayer reflective film and a metal half mirror. Each of the dielectric multilayer film mirrors 43 and 45 is formed by a multilayer film in which materials of different refractive indices are alternately stacked. In accordance with light to be modulated, following substances are useful as such materials.

(1) For Transmission of Visible Light or Infrared Light

As a material of a high refractive index (a material having a refractive index of about 1.8 or higher), useful are $TiO_2$, $CeO_2$, $Ta_2O_5$, $ZrO_2$, $Sb_2O_3$, $HfO_2$, $La_2O_3$, $NdO_3$, $Y_2O_3$, ZnO, and $Nb_2O_5$.

As a material of a relatively high refractive index (a material having a refractive index of about 1.6 to 1.8 or higher), useful are MgO, $Al_2O_3$, $CeF_3$, $LaF_3$, and $NdF_3$.

As a material of a low refractive index (a material having a refractive index of about 1.5 or lower), useful are $SiO_2$, $AlF_3$, $MgF_2$, $Na_3AlF_6$, NaF, LiF, $CaF_2$, and $BaF_2$.

(2) For Transmission of Ultraviolet Light

As a material of a high refractive index (a material having a refractive index of about 1.8 or higher), useful are $ZrO_2$, $HfO_2$, $La_2O_3$, $NdO_3$, $Y_2O_3$ or $TiO_2$, $Ta_2O_5$, and $ZrO_2$ (the wavelength of light is about 360 to 400 nm).

As a material of a relatively high refractive index (a material having a refractive index of about 1.6 to 1.8 or higher), useful are MgO, $Al_2O_3$, $LaF_3$, and $NdF_3$.

As a material of a low refractive index (a material having a refractive index of about 1.5 or lower), useful are $SiO_2$, $AlF_3$, $MgF_2$, $Na_3AlF_6$, NaF, LiF, and $CaF_2$.

In the spatial light modulator 300, when the voltage application between the electrode layers 4 and 11 of the support substrate 6 and the movable thin film 9 which are opposed to each other is cancelled as shown in FIG. 5 (i.e., when the driving voltage V=0), the gap distance $t_{OFF}$ between the opposed dielectric multilayer film mirrors 43 and 45 is set to a default value corresponding to the wavelength of incident light, so that light 48 which perpendicularly enters the transparent substrate 13 is reflected. Namely, the spatial light modulator is maintained to the OFF state.

When the given driving voltage Va is applied between the electrode layers 4 and 11 of the support substrate 6 and the movable thin film 9 which are opposed to each other as shown in FIG. 6, the gap distance $t_{ON}$ between the opposed dielectric multilayer film mirrors 43 and 45 is set to a default value corresponding to the wavelength of incident light, so that light 48 which perpendicularly enters the transparent substrate 13 is transmitted through the movable thin film 9 and the returning electrode 23. Namely, the spatial light modulator 300 is set to the ON state.

When the spatial light modulator 300 is to be switched from the ON state shown in FIG. 6 to the OFF state, the voltage application between the electrode layers 4 and 11 of the support substrate 6 and the movable thin film 9 is canceled, and the predetermined driving voltage Vb is simultaneously applied between the electrode layer 11 of the movable thin film 9 and the returning electrode 23, thereby causing the movable thin film 9 to be returned at a higher speed from the flexural deformation. This is identical with the first embodiment described above.

Figure 8:
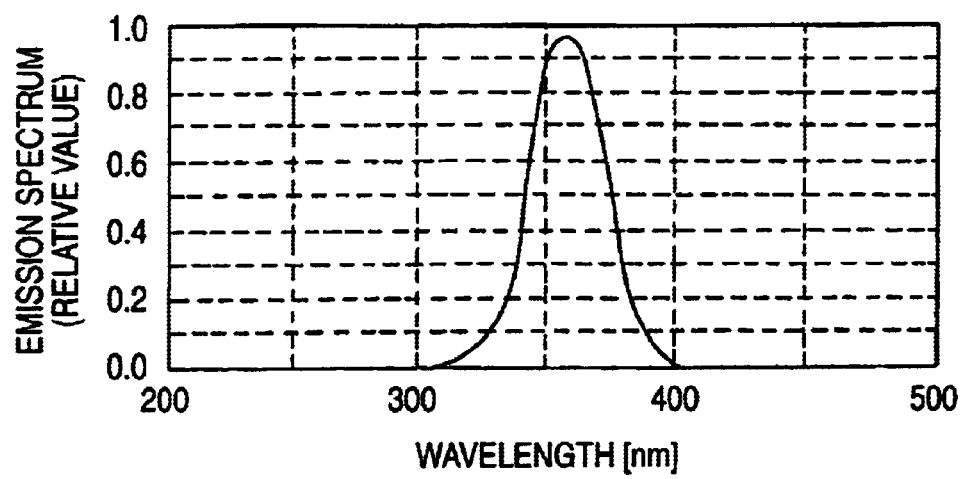
FIG. 8 is a graph showing the emission spectrum of light which is introduced into an optical waveguide of the spatial light modulator.

The light modulating operation by the spatial light modulator 300 will be described in detail. FIG. 8 is a graph showing the emission spectrum of the light 48 incident on the support substrate 6. The incident light 48 is light having a center wavelength $\lambda_0$ of about 360 nm.

In the spatial light modulator 300 of the embodiment, for example, the gap distances $t_{ON}$ and $t_{OFF}$ between the dielectric multilayer film mirrors 43 and 45 when the spatial light modulator 300 is in the ON and OFF states are set as follows:

$t_{ON} = \frac{1}{2} \times \lambda_0 = 180$ nm $t_{OFF} = \frac{3}{4} \times \lambda_0 = 270$ nm.

Depending on the gap distance between the dielectric multilayer film mirrors 43 and 45, the wavelength of light which can be transmitted through the spatial light modulator 300 is switched over.

In the dielectric multilayer film mirrors 43 and 45, the intensity reflectivity is R=0.85. The gap between the mirrors is filled with air or a rare gas, and the refractive index of the gap is n=1. Alternatively, any combination of the gap distances $t_{ON}$ and $t_{OFF}$, the refractive index n, the intensity reflectivities R of the dielectric multilayer film mirrors 43 and 45 may be employed as far as the interference conditions are satisfied.

The gap distance $t_{OFF}$ of the spatial light modulator 300 in the OFF state can be controlled during the process of producing the device. The gap distance $t_{ON}$ of the device in the ON state can be controlled by adjusting the balance between the electrostatic force to be generated and the elastic restoring force which is generated when the movable thin film 9 is deformed. In order to perform a more stable control, the gap between the movable thin film 9 and the returning electrode 23 may be filled with the above-mentioned spacer.

Figure 9:
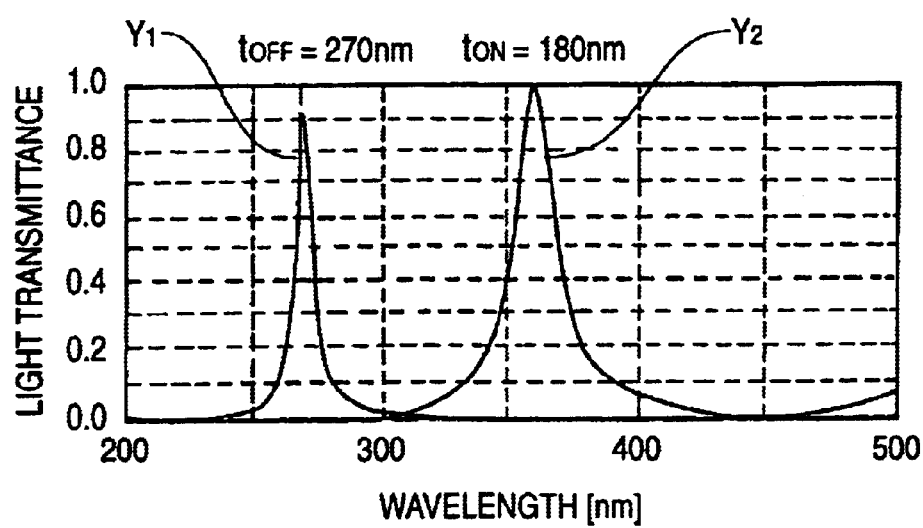
FIG. 9 is a graph showing changes of the light transmittance of the spatial light modulator with respect to the wavelength of incident light.

FIG. 9 is a graph showing light transmittances of the spatial light modulator 300 with respect to the wavelength in the case where the gap distances between the dielectric multilayer film mirrors 43 and 45 are $t_{ON}$ and $t_{OFF}$.

The curve $Y_1$ shows the transmittance characteristic in the case where the gap distance between the dielectric multilayer film mirrors 43 and 45 is 270 nm. In this case, incident light having a center wavelength $\lambda_0$ of 360 nm cannot be transmitted through the device. The curve $Y_2$ shows the transmittance characteristic in the case where the gap distance between the dielectric multilayer film mirrors 43 and 45 is 180 nm. In this case, incident light having a center wavelength $\lambda_0$ of 360 nm can be transmitted through the device.

In the embodiment, the incident light 48 on the transparent substrate 13 has the center wavelength $\lambda_0$ of about 360 nm. When the gap distance between the dielectric multilayer film mirrors 43 and 45 is $t_{ON}$, therefore, the incident light can be transmitted through the spatial light modulator 300, but, when the gap distance between the dielectric multilayer film mirrors 43 and 45 is $t_{OFF}$, the incident light cannot be transmitted through the spatial light modulator 300.

In the spatial light modulator 300, when the layered structures of the dielectric multilayer film mirrors 43 and 45 are adequately changed in accordance with the wavelength of incident light, it is possible to invert the ON/OFF characteristics.

In the embodiment also, when the spatial light modulator is to be switched from the ON state to the OFF state, the driving voltage Vb is applied between the electrode layer 11 and the returning electrode 23 as shown in FIG. 7, and the returning of the movable thin film 9 can be accelerated by the electrostatic force which is exerted by the returning electrode 23 on the movable thin film 9. In the same manner as the first and second embodiments which have been described above, both the reduction in the operating voltage, and the increase of the ON/OFF switching speed of the spatial light modulator can be simultaneously realized.

When the gap between the dielectric multilayer film mirrors 43 and 45 is continuously changed by the value of the driving voltage, the center wavelength of the transmission spectrum can be arbitrarily set. According to the configuration, the amount of transmitted light can be continuously controlled. Namely, the gradation control can be performed in accordance with the applied driving voltage.

Figure 10:
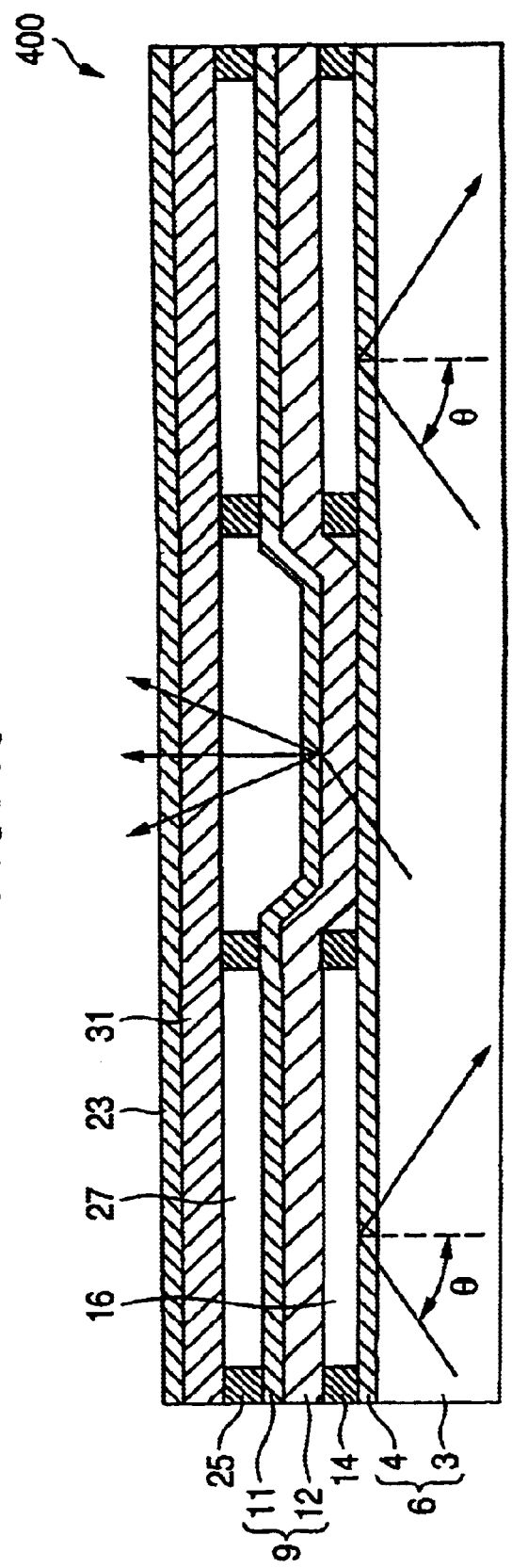
FIG. 10 is a view of a spatial light modulator array which is configured by arranging one- or two-dimensionally spatial light modulators.

As shown in FIG. 10, plural spatial light modulators of any one of above-described embodiments may be arranged one- or two-dimensionally to constitute a spatial light modulator array 400. In this case, one- or two-dimensional light modulation can be performed.

Next, an image forming device which is configured by using the spatial light modulator array will be described. First, an exposing device 500 will be described as an example of the image forming device.

Figure 11:
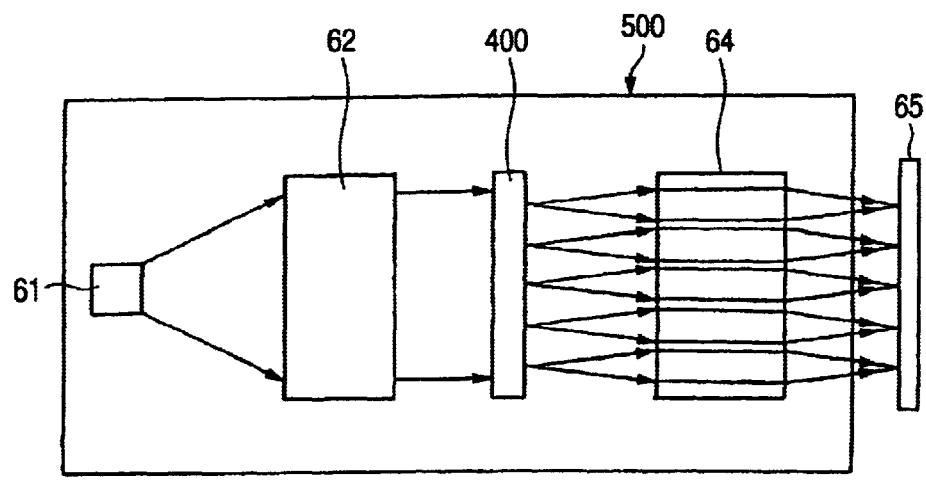
FIG. 11 is a diagram schematically showing the configuration of an exposing device which is configured by using the spatial light modulator array.

FIG. 11 is a diagram schematically showing the configuration of the exposing device which is configured by using the spatial light modulator array of the invention.

The exposing device 500 comprises: an illumination light source 61; an illumination optical system 62; a spatial light modulator array 400 in which plural spatial light modulators of any one of the above-described embodiments are arranged two-dimensionally on the same plane; and a projection optical system 64.

The illumination light source 61 is a light source such as a laser device, a high-pressure mercury lamp, or a short arc lamp.

For example, the illumination optical system 62 is a collimating lens which converts flat light emitted from the illumination light source 61 to parallel light. The parallel light which has been transmitted through the collimating lens perpendicularly enters each of the spatial light modulators of the spatial light modulator array 400.

As the means for converting the flat light emitted from the illumination light source 61 to parallel light, known is a method of arranging two microlenses in series, in addition to the collimating lens. When a lamp having a small luminous point, such as a short arc lamp is used as the illumination light source 61, the illumination light source 61 can be deemed as a point light source, and parallel light can enter the spatial light modulator array 400. Alternatively, parallel light may be caused to enter each of the spatial light modulators of the spatial light modulator array 400 by using an LED array having LEDs respectively corresponding to the spatial light modulators of the spatial light modulator array 400 as the illumination light source 61, and causing the LED array so as to emit light while being placed near the spatial light modulator array 400. In the case where a laser device is used as the illumination light source 61, the illumination optical system 62 may be omitted.

The projection optical system 64 projects light onto a recording medium 65 serving as an image forming face, and is configured by, for example, a microlens array having microlenses respectively corresponding to the spatial light modulators of the spatial light modulator array 400.

Hereinafter, the operation of the exposing device 500 will be described.

The flat light emitted from the illumination light source 61 impinges on the illumination optical system 62. Light which has been converted to parallel light by the system enters the spatial light modulator array 400. With respect to light entering each of the spatial light modulators of the spatial light modulator array 400, the transmittance is controlled in accordance with an image signal. Light emitted from the spatial light modulator array 400 is projected by the projection optical system 64 onto the image forming face of the recording medium 65. The projection light is projected onto the recording medium 65 while being relatively moved in a scanning direction, so that a large area can be exposed at a high resolution.

When a collimating lens is disposed on the side of the light incident face of the spatial light modulator array 400 as described above, light respectively entering the flat substrates of the spatial light modulators can be converted to parallel light.

Alternatively, the spatial light modulator array 400 may be an array in which plural spatial light modulators of the third embodiment are one-dimensionally arranged on the same plane. When plural spatial light modulators of the first or second embodiment are to be arranged in the same manner as described above to constitute the spatial light modulator array 400, an optical element which selects an optical path is placed across a transparent medium on the light entering side of each of the spatial light modulators. As the transparent medium, the optical waveguide 3 may be used as it is. Alternatively, a layer of a transparent medium may be formed between the optical waveguide 3 and the electrode layer 4.

The optical element which selects an optical path means an optical element in which a substantially whole of selected transmission light emitted from the optical element has an angular component that is larger than the critical angle of total reflection in the front layer in the optical path of incident light, and incident light having another angular component is selectively reflected so as not to be transmitted through the optical element. Namely, in the interface between the spatial light modulator and the transparent medium placed between the spatial light modulator and the optical element which selects an optical path, only incident light having an angular component that is larger than the critical angle θc of total reflection which is a condition for causing total reflection is transmitted through the optical element which selects an optical path, and incident light having another angular component is blocked. The critical angle θc of total reflection is obtained by the following expression. In the expression, n1 is the refractive index of the transparent medium which is inside the interface, and n2 is the refractive index of the outside of the interface.

$$\theta c = \sin^{-1}(n2/n1).$$

A specific example of the optical element which selects an optical path is an optical interference filter formed by a dielectric multilayer film. Alternatively, for example, cholesteric liquid crystal device functioning as a Bragg reflection filter may be used.

In the exposing device 500, in place of the collimating lens, a microlens array may be used as the illumination optical system 62. In this case, the device is designed and adjusted sot that the microlenses of the microlens array correspond to the spatial light modulators of the spatial light modulator array 400, respectively, and the axis and focal plane of each microlens coincide with the center of the corresponding spatial light modulator.

The incident light from the illumination light source 61 is converged by the microlens array into respective regions which are smaller in area than each of the spatial light modulators, and then enters the spatial light modulator array 400. With respect to light entering each of the spatial light modulators of the spatial light modulator array 400, the transmittance is controlled by a control device (not shown) in accordance with the image signal. Light emitted from the spatial light modulator array 400 is projected by the projection optical system 64 onto the image forming face of the recording medium 65. The projection light is projected onto the recording medium 65 while being relatively moved in a scanning direction, so that a large area can be exposed at a high resolution.

As described above, the light from the illumination light source 61 can be converged by the microlens array, and hence it is possible to realize an exposing device having an improved light utilization efficiency.

The shape of the lens surface of each microlens is not particularly limited and may be spherical or semispherical, or have a convex curved surface or a concave curved surface. The microlens array may be formed into a flat shape having a refractive index distribution, or may be configured by arraying Fresnel lenses or diffraction lenses due to binary optics or the like.

Examples of the material of the microlenses are transparent glass and a resin. From the viewpoint of the mass productivity, a resin is superior, and, from the viewpoint of the life period and the reliability, glass is superior. From an optical viewpoint, as the glass, quartz glass, fused silica glass, alkali-free glass, and the like are preferable, and, as the resin, an acrylic resin, an epoxy resin, a polyester resin, a polycarbonate resin, a styrene resin, a vinyl chloride resin, and the like are preferable. The resin may be of the photo curing type, the thermoplastic type, or the like. It is preferable to adequately select the type of the resin in accordance with the method of producing the microlenses.

A practical method of producing the microlenses is a method such as the cast molding method using dies, the press molding method, the injection molding method, the printing method, or the photolithography method. As a production method which can form microlenses finely and accurately at a high productivity, in the case where the microlenses are to be formed by a resin material, the cast molding method in which a photo (ultraviolet rays or the like) curing resin, or the photolithography method in which a positive or negative resist material is used is preferably used, and, in the case where the microlenses are to be formed by glass, the resist transfer method using RIE (reactive ion etching), the isotropic etching method, or the ion exchange method is preferably used.

In the case where microlenses are to be formed by the die molding method, for example, a thermoplastic resin is hot pressed by dies having a shape identical with that of the microlenses. When molding is to be conducted more finely, the molding process is preferably conducted in the following manner. A photo curing resin or a thermoplastic resin is filled into dies and then pressed, the resin is thereafter cured by light or heat, and the cured resin is separated from the dies. According to the method, fine molding is enabled. In the case where the microlenses are requested to be finely and accurately, particularly, it is preferable to use a photo curing resin which is less expanded and contracted by heat.

In the case where microlenses made of a resin are to be formed by the photolithography method, for example, a photo-dissolving resin which is typified by a transparent photoresist or a photo-curing resin is exposed by ultraviolet rays (or visible rays) through an adequately patterned light shielding mask, and exposed portions or unexposed portions are dissolved and developed to form microlenses. As a result, in accordance with the resin material and the exposure amount distribution, it is possible to obtain microlenses of a desired shape. Depending on the resin material, a baking process may be conducted after developing, and microlenses of a desired shape may be obtained by means of the surface tension when the resin material is thermally softened (the reflow method).

In the case where microlenses made of glass are to be formed by the photolithography method, for example, the microlenses are formed by etching a transparent substrate on which spatial light modulators are configured, and through which light from the above-mentioned light source can be transmitted. In the etching process, when a film is applied in a shape corresponding to the microlenses, the substrate can be easily processed into the desired shape.

Next, a projecting device will be described as another example of the image forming device.

Figure 12:
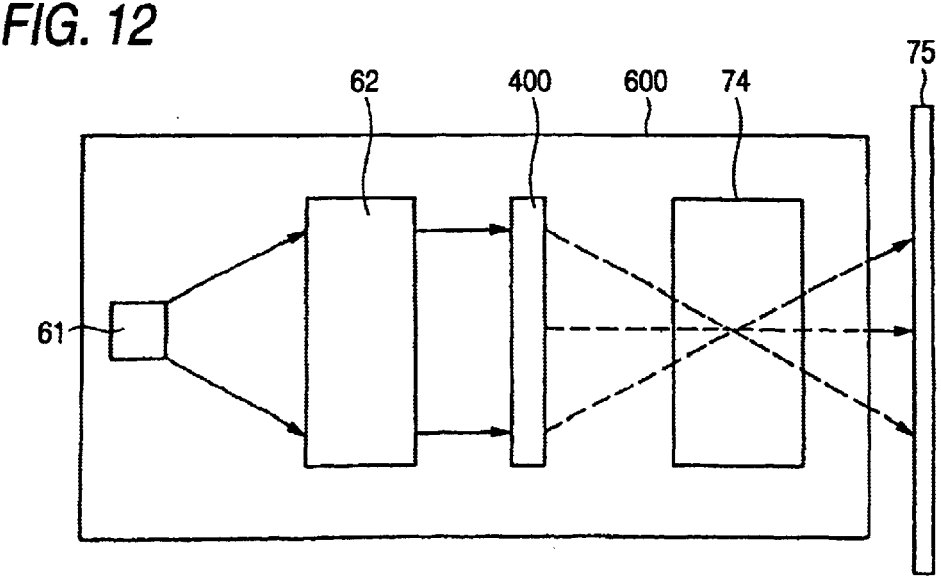
FIG. 12 is a diagram schematically showing the configuration of a projecting device which is configured by using the spatial light modulator array.

FIG. 12 is a diagram schematically showing the configuration of a projecting device which is configured by using the spatial light modulator array of the invention. The components identical with those of FIG. 11 are denoted by the same reference numerals, and their description is omitted.

A projector 600 serving as a projecting device comprises an illumination light source 61; an illumination optical system 62; a spatial light modulator array 400; and a projection optical system 74.

The projection optical system 74 is an optical system for the projecting device which projects light onto a screen 75 functioning as an image forming face.

The illumination optical system 62 may be the above-described collimating lens, or a microlens array.

Hereinafter, the operation of the projecting device 600 will be described.

The incident light from the illumination light source 61 is converged by the microlens array into respective regions which are smaller in area than each of the spatial light modulators, and then enters the spatial light modulator array 400. With respect to light entering the optical functional film of each of the spatial light modulators of the spatial light modulator array 400, the transmittance is controlled in accordance with the image signal. Light emitted from the spatial light modulator array 400 is projected by the projection optical system 74 onto the image forming face of the screen 75.

As described above, the spatial light modulator array 400 can be used also in a projecting device. Furthermore, the spatial light modulator array 400 can be applied also to a display device.

Next, an example in which a display device is configured by using plural spatial light modulators of the above-described third embodiment will be described.

Figure 13:
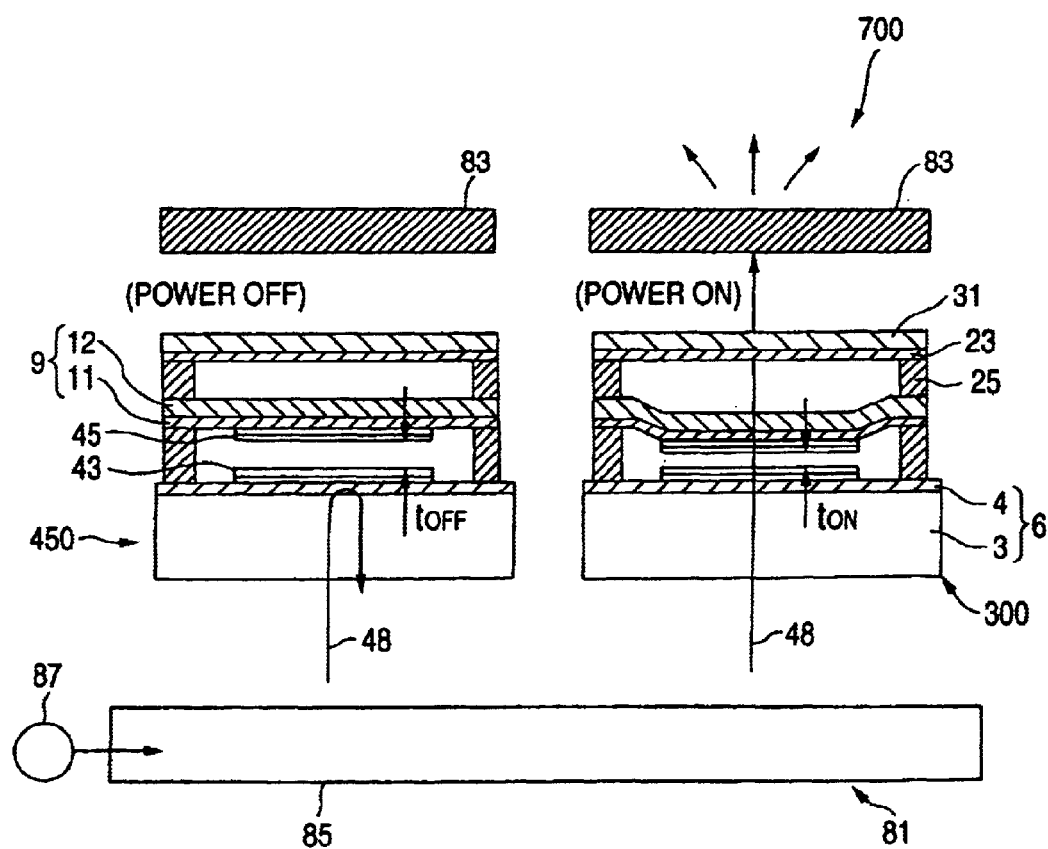
FIG. 13 is a diagram schematically showing the configuration of a flat panel display which is configured by using the spatial light modulator array.

As shown in FIG. 13, a display device 700 comprises: a spatial light modulator array 450 in which plural spatial light modulators 300 described above are arranged one- or two-dimensionally; a light source unit 81 which is disposed on the light incident side of the spatial light modulator array 450, and which emits ultraviolet rays; and fluorescent members 83 which are disposed on the light emission side of the spatial light modulator array 450, and which receive light emitted from the respective spatial light modulators 300 to be excited thereby to emit light. For example, the fluorescent members 83 emit the three primary colors (such as red, blue, and green, or cyan, magenta, and yellow), and are arranged in adequate sequence, thereby enabling the display device to provide a full-color display.

The light source unit 81 has: a waveguide 85 for producing flat light; and a black light ultraviolet lamp (low-pressure mercury lamp) 87 which is placed on a side face of the waveguide 85. The waveguide 85 functioning as an illumination optical system receives ultraviolet rays from the black light low-pressure mercury lamp 87 serving as a light source, through the side face, and emits the light as the incident light 48 from the surface opposed to the spatial light modulator 300.

When a fluorescent material for black light (such as $BaSi_2O_5:Pb^{2+}$) is applied to the inner wall of the low-pressure mercury lamp 87, the emitted ultraviolet rays have the spectral characteristics of FIG. 8, or have a center wavelength $\lambda_0$ in the vicinity of 360 nm. The ultraviolet rays are used as a back light.

In the flat panel display 700 having the spatial light modulator array 450, when a driving voltage is applied between the electrode layers 4 and 11, the movable thin film 9 is deflected toward the support substrate 6, whereby a multilayer film interference effect is produced so that light modulation can be performed on the ultraviolet rays. When the driving voltage between the electrode layers 4 and 11 is turned OFF and a driving voltage is applied between the electrode layer 11 and the returning electrode 23, the movable thin film 9 can be returned at a high speed from the flexural deformation. As a result, an image display of high responsibility is enabled, and an excellent performance of displaying a moving picture can be obtained.

The display device may be configured so that the incident light to be guided to the spatial light modulator array 450 of the flat panel display 700 is obtained by converging the light from the light source by a microlens array. In this case, the incident light can be concentrated only to the light modulation region (the region of the dielectric multilayer film mirrors 43 and 45) of each spatial light modulator, so that the incident light can be prevented from being wastefully absorbed by a region other than the light modulation region. Therefore, the light utilization efficiency can be improved, and the display brightness can be increased.

Hereinafter, results of simulation analyses which were conducted on the spatial light modulator of the first embodiment in order to ascertain the speed increasing effect due to the provision of the returning electrode will be described.

In the conventional spatial light modulator 1 such as shown in FIG. 15, when the movable thin film 9 is to be displaced, the driving voltage is applied between the electrode layers 4 and 11, and an attractive force due to an electrostatic force is caused to act between the electrode layers 4 and 11, whereby the movable thin film 9 is downward displaced. When the movable thin film 9 is to be returned from the displaced position to the original position, the voltage applied between the electrode layers 4 and 11 is turned OFF, and the movable thin film 9 is returned by its elastic restoring force.

By contrast, in the spatial light modulator 100 of the invention shown in FIG. 1, when the movable thin film 9 is to be displaced, the driving voltage is applied between the electrode layer 4 of the support substrate 6 and the electrode layer 11 of the movable thin film 9, and the movable thin film is downward displaced by an attractive force acting between the electrode layers 4 and 11. When the movable thin film 9 is to be returned, the voltage applied between the electrode layers 4 and 11 is turned OFF, and the driving voltage is applied between the electrode layer 11 of the movable thin film 9 and the returning electrode 23 on the support plate 31, so that the movable thin film 9 is returned by its elastic restoring force and the attractive force.

In the spatial light modulator 100, therefore, the function of the returning electrode 23 causes the force of returning the movable thin film 9 to be larger by the degree corresponding to the attractive force due to the electrostatic force than that in the conventional spatial light modulator 1 shown in FIG. 15. As a result, the speed of the returning operation is increased.

Figure 14:
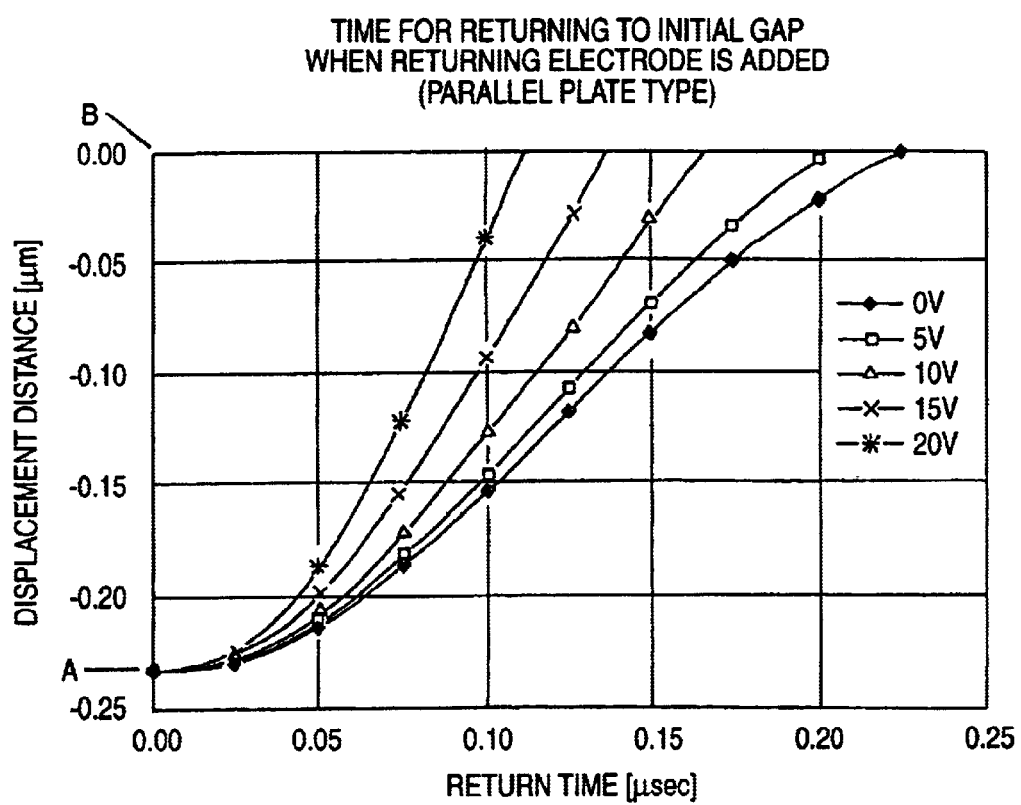
FIG. 14 is a graph showing results of simulation analyses which were conducted in order to ascertain the speed increasing effect due to the provision of a returning electrode.

In order to ascertain the speed increasing effect due to the provision of the returning electrode 23, simulation analyses were conducted under the following conditions. FIG. 14 shows results of the analyses.

(a) Electrode layer 4 of the support substrate 6
material: Al thickness: t=0.15 µm
(b) Returning electrode 23
material: Al thickness: t=0.4 µm
(c) Electrode layer 11 of the movable thin film 9
material: Al thickness: t=0.15 µm
(d) Elastic layer 12 of the movable thin film 9
material: SiN thickness: t=0.8 µm
(e) Internal stresses of all the layers in non-driven state are 0 MPa
(f) Dimensions of the gap 16 between the electrode layer 4 and the elastic layer 12, and the gap 27 between the electrode layer 11 and the support plate 31 0.23 µm
(g) Ambient atmosphere of the spatial light modulators was vacuum environment.

First, the driving voltage is applied between the electrode layers 4 and 11 to set the state where the movable thin film 9 is displaced toward the support substrate 6 and the gap 16 is not formed. At this time, the value of the displacement distance of the movable thin film 9 is at a position (point A of FIG. 14) below 0.23 µm. In this state, while the driving voltage between the electrode layers 4 and 11 was turned OFF and the driving voltage of 0 to 20 V (at a step of 5 V) was applied between the electrode layer 11 and the returning electrode 23, the response characteristics at each driving voltage was analyzed. The response time means the time required for the movable thin film 9 to return from the displaced state (point A) to the state (point B of FIG. 14) before the displacement.

In the simulation results shown in FIG. 14, the results at the driving voltage of 0 V correspond to the return time in a device which configured in the same manner as the conventional device. As the driving voltage is higher, the return time is shorter as compared with that at the driving voltage of 0 V. For example, the return time when the driving voltage is 0 V is about 0.225 µs, and that when the driving voltage is 20 V is about 0.115 µs. Namely, the speed is increased by about two times. In the simulation, results were obtained by raising the driving voltage to 20 V. It is supposed that the speed can be made faster by further raising the voltage. As a result, it has been found that a spatial light modulator can be driven at a higher speed by disposing a returning electrode.

According to the spatial light modulator, the spatial light modulator array, the image forming device and the flat panel display of the invention, when the spatial light modulator is set to the ON state by applying a voltage between the electrode layers of the support substrate and the movable thin film and the voltage application is then canceled to turn OFF the spatial light modulator, the movable thin film which is deflected toward the support substrate is compulsively returned by the elastic restoring force, and also by an electrostatic attractive force which is caused to act in the direction opposite to the side of the support substrate by applying a driving voltage between the movable thin film and the returning electrode. In the case where the elastic restoring force of the movable thin film is previously set to a weak level in order to realize a low-voltage driving, therefore, the return speed of the movable thin film in the state change of the spatial light modulator from the ON state to the OFF state can be increased even when the elastic restoring force is weak. Consequently, both the reduction in the driving voltage, and the increase of the ON/OFF switching speed of the spatial light modulator can be simultaneously realized.

What is claimed is:

1. A spatial light modulator which comprises:
support substrate that has an electrode layer; and
movable thin film that has at least an electrode layer, and that is opposingly placed above said support substrate with being separated by a predetermined gap distance in a manner that said movable thin film is flexurally deformable toward said support substrate, and in which a predetermined driving voltage is applied between said electrode layer of said support substrate and said electrode layer of said movable thin film to cause said movable thin film to be deflected toward said support substrate by an electrostatic force acting between said electrode layers, whereby optical characteristics of said device with respect to incident light are changed to perform light modulation on the incident light,
wherein a returning electrode is disposed on a side of said movable thin film, said side being opposite to said support substrate, said returning electrode applying an electrostatic force of attracting said movable thin film when a driving voltage is applied.

2. A spatial light modulator according to claim 1, wherein a spacer which prevents said movable thin film from being flexurally deformed toward said returning electrode is disposed between said movable thin film and said returning electrode.

3. A spatial light modulator according to claim 1, wherein a change of the optical characteristics is a change of total reflection conditions due to a change of a refractive index of an interface between said movable thin film and said support substrate, the refractive index change being caused by making said movable thin film contact with said support substrate.

4. A spatial light modulator according to claim 2, wherein a change of the optical characteristics is a change of total reflection conditions due to a change of a refractive index of an interface between said movable thin film and said support substrate, the refractive index change being caused by making said movable thin film contact with said support substrate.

5. A spatial light modulator according to claim 3, wherein said electrode layer of said support substrate, said electrode layer of said movable thin film, and said returning electrode are optically transparent.

6. A spatial light modulator according to claim 4, wherein said electrode layer of said support substrate, said electrode layer of said movable thin film, and said returning electrode are optically transparent.

7. A spatial light modulator according to claim 1, wherein
a multilayer reflective film is disposed on each of opposed sides of said movable thin film and said support substrate, and
the optical characteristics are optical interference characteristics according to the gap distance between said movable thin film and said support substrate, and a wavelength of the incident light.

8. A spatial light modulator according to claim 2, wherein
a multilayer reflective film is disposed on each of opposed sides of said movable thin film and said support substrate, and
the optical characteristics are optical interference characteristics according to the gap distance between said movable thin film and said support substrate, and a wavelength of the incident light.

9. A spatial light modulator array wherein plural spatial light modulators according to claim 1 are arranged one- or two-dimensionally.

10. An image forming device comprising:
a light source;
a spatial light modulator array according to claim 9;
an illumination optical system which illuminates said spatial light modulator array with light from said light source; and
a projection optical system which projects light emitted from said spatial light modulator array onto an image forming face.

11. A flat panel display comprising:
a light source which emits ultraviolet rays;
a spatial light modulator array according to claim 9;
an illumination optical system which illuminates said spatial light modulator array with light from said light source; and
a fluorescent member which is excited by light emitted from said spatial light modulator array to emit light.

* * * * *